United States Patent
Kuhn

(10) Patent No.: US 8,364,021 B2
(45) Date of Patent: Jan. 29, 2013

(54) SYSTEMS AND METHODS FOR MANAGING STORED PROGRAMS

(75) Inventor: Richard Kuhn, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 525 days.

(21) Appl. No.: 12/547,733

(22) Filed: Aug. 26, 2009

(65) Prior Publication Data

US 2011/0052156 A1 Mar. 3, 2011

(51) Int. Cl.
*G11B 27/00* (2006.01)
*H04N 5/93* (2006.01)
*H04N 9/80* (2006.01)
*G06F 3/00* (2006.01)

(52) U.S. Cl. ........ 386/282; 386/239; 386/243; 386/249; 386/262; 715/716; 715/718; 715/719; 715/720; 715/721; 715/722; 715/723

(58) Field of Classification Search .................. 386/239, 386/243, 249, 262, 282; 715/716, 718, 719, 715/720, 721, 722, 723
See application file for complete search history.

(56) References Cited

U.S. PATENT DOCUMENTS

| | | | |
|---|---|---|---|
| 7,088,910 B2 | 8/2006 | Potrebic et al. | |
| 7,136,882 B2 * | 11/2006 | Collins et al. ......................... | 1/1 |
| 7,290,211 B2 | 10/2007 | Goodwin et al. | |
| 7,394,967 B1 | 7/2008 | Potrebic et al. | |
| 7,398,009 B2 | 7/2008 | Candelore et al. | |
| 7,519,627 B2 | 4/2009 | Malloy | |
| 7,565,608 B2 * | 7/2009 | Faraday et al. ............... | 715/723 |
| 2001/0033736 A1 | 10/2001 | Yap et al. | |
| 2006/0037043 A1 | 2/2006 | Kortum et al. | |
| 2006/0064716 A1 * | 3/2006 | Sull et al. ......................... | 725/37 |
| 2006/0078277 A1 * | 4/2006 | Miyazaki ......................... | 386/46 |
| 2006/0174309 A1 | 8/2006 | Pearson | |
| 2006/0212904 A1 | 9/2006 | Klarfeld et al. | |
| 2007/0127887 A1 | 6/2007 | Yap et al. | |
| 2008/0247724 A1 | 10/2008 | Potrebic et al. | |
| 2009/0010610 A1 | 1/2009 | Scholl et al. | |
| 2009/0010618 A1 | 1/2009 | Devlin | |
| 2009/0142036 A1 | 6/2009 | Branam et al. | |

* cited by examiner

*Primary Examiner* — Daquan Zhao
(74) *Attorney, Agent, or Firm* — Lowe Graham Jones PLLC

(57) ABSTRACT

Systems and methods are operable to manage previously recorded programs. In at least one embodiment identifies a plurality of previously recorded programs, categorizes each one of the plurality of previously recorded programs into one of a plurality of recorded program categories, and generates a recorded program category-based graphical user interface (GUI). The recorded program category-based GUI graphically depicts the plurality of recorded program categories and graphically depicts an amount of memory capacity utilized by each of the plurality of recorded program categories based upon an amount of memory capacity utilized by the previously recorded programs.

19 Claims, 3 Drawing Sheets

SYSTEMS AND METHODS FOR MANAGING STORED PROGRAMS

BACKGROUND

Programming received at media device, such as at a set top box (STB) or the like, may be stored for later viewing in a digital video recorder (DVR) or other suitable recording device. At a later time, the stored programming may be retrieved from the DVR or recording device, and then presented to the viewer on a display, such as a television or the like.

However, the DVR or recording device typically has a limited memory capacity that is available for storing the programming. Thus, there is a limit to the number of programs that may be stored on the DVR or recording device. At some point, the DVR or recording device will run out of available memory capacity such that no new programming can be recorded. Accordingly, the viewer must selectively delete previously stored programming to free up memory capacity in the DVR or recording device.

Further, programming is now becoming increasingly available in a high definition (HD) format. HD programming uses a relatively large amount of digital data to provide higher image and sound quality. Since a HD program requires more memory capacity, fewer HD programs can be stored in the DVR or recording device.

When a viewer determines that more memory capacity is required on their DVR or recording device, the viewer can selectively delete stored programs, thereby increasing the amount of available memory capacity. Utilized memory capacity (and/or available) may be expressed as a percentage of the total available memory capacity.

Typically, the viewer operates their media device to display a graphical user interface (GUI), such as a menu or the like. The GUI provides a listing of previously recorded programming that has been stored on their DVR or recording device. Typically, for each recorded program, the GUI lists the title of the program, the program duration, along with the date and time that the program was recorded. Some systems may also list the amount of memory capacity utilized by each program, may list the remaining available amount of memory capacity that may be used for future program recordings (or conversely, and/or may list the amount of memory capacity that is currently used for recorded programs), and/or may list other information of interest.

The viewer navigates about the displayed GUI and selects recorded programs that are to be deleted. As stored programs are deleted, memory capacity becomes increasingly available for recording future or currently presented programming. The process of navigating about the GUI and manually selecting programs for deletion is relatively cumbersome and time consuming. And, all too often the viewer wishes to record a program that is currently being presented. Accordingly, if the viewer must first access the GUI and then manually delete programs to make room to store the currently presented program, a portion of the currently presented program may not be recorded due to the time that is required for the viewer to manually select and delete previously recorded programs.

Some DVRs or recording devices employ various processes to automatically delete previously recorded programs. For example, a program that was recorded at a time/date that is before some threshold period may be automatically deleted (unless the viewer specifically selects the program for permanent storage). For example, the DVR or recording device may automatically delete a program one month after it has been recorded. Various other schemes have been devised to automatically select and delete previously recorded programs.

However, even with DVRs or recording devices having automatic program deleting functions, it is likely that from time to time the DVR or recording device will have acquired a sufficiently large number of stored programs such that insufficient memory capacity is available for storing new programs of interest. Thus, there is a need to provide a viewer an efficient way to quickly identify and select previously recorded programs for deletion from their DVR or recording device.

SUMMARY

Systems and methods of managing previously recorded programs are disclosed. An exemplary embodiment has a program content stream interface configured to receive a plurality of programs, a digital video recorder (DVR) configured to store a plurality of selected ones of the received plurality of programs, and a processor system that manages the stored plurality of programs on the DVR. The processor system is configured to categorize each one of the stored plurality of programs into one of a plurality of recorded program categories and to generate a recorded program category-based graphical user interface (GUI). The recorded program category-based GUI graphically depicts the plurality of recorded program categories, and graphically depicts an amount of memory capacity utilized by each of the plurality of recorded program categories based upon an amount of memory capacity utilized by the stored plurality of programs.

In accordance with further aspects, an exemplary embodiment identifies a plurality of previously recorded programs, categorizes each one of the plurality of previously recorded programs into one of a plurality of recorded program categories, and generates a recorded program category-based graphical user interface (GUI). The recorded program category-based GUI graphically depicts the plurality of recorded program categories and graphically depicts an amount of memory capacity utilized by each of the plurality of recorded program categories based upon an amount of memory capacity utilized by the previously recorded programs.

BRIEF DESCRIPTION OF THE DRAWINGS

Preferred and alternative embodiments are described in detail below with reference to the following drawings.

DETAILED DESCRIPTION

Figure 1:
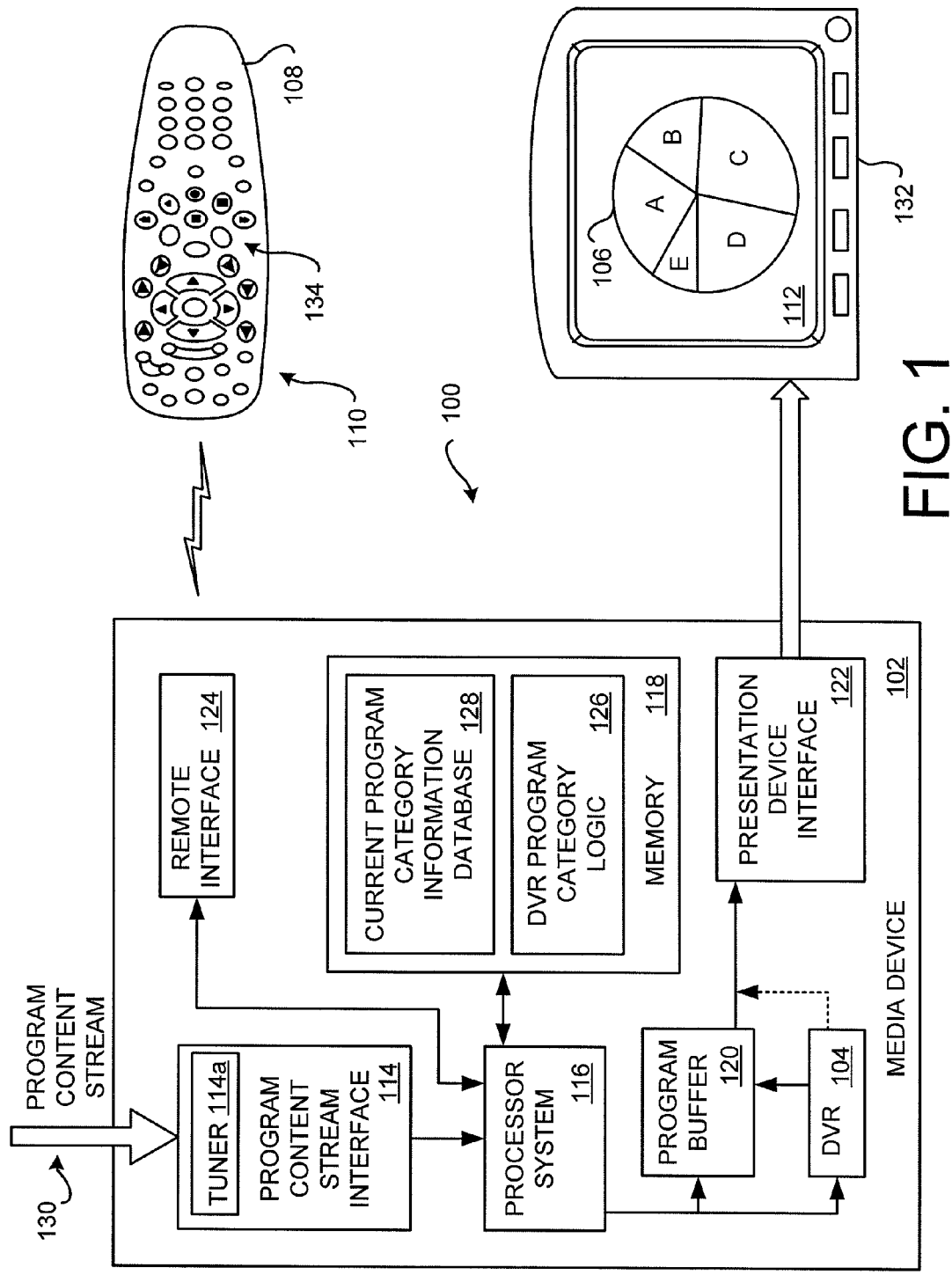
FIG. 1 is a block diagram of an embodiment of the digital video recorder (DVR) management system.

FIG. 1 is a block diagram of an embodiment of the digital video recorder (DVR) management system 100 that manages recorded programs. An exemplary embodiment of the DVR management system 100 may be implemented in any electronic media device 102 having a DVR 104 or other suitable recording device. For example, but not limited to, the recording device may be external to the media device 102, such as a personal computer (PC) or at a recording device located at a remote site that is accessible by the media device 102. An exemplary media device 102 includes, but is not limited to, a set top box (STB) or a PC. Embodiments of the DVR management system 100 may be implemented in, or in conjunction with, other media devices with recording capability, such as, but not limited to, televisions (TVs), digital video disc (DVD) players, multimedia telephones, personal device assistants (PDAs), or personal computers (PCs).

Embodiments of the DVR management system 100 are operable to present a recorded program category-based graphical user interface (GUI) 106 that graphically depicts categories of previously recorded programs stored in the DVR 104 or other recording device. The recorded program category-based GUI 106 quickly imparts information to a viewer by indicating memory capacity utilization of the DVR 104 by graphically depicting the amount of memory capacity utilized by each of the plurality of recorded program categories. This depicted memory capacity utilization is based upon an amount of memory capacity utilized by each of the previously recorded programs that have been categorized into the respective ones of the plurality of recorded program categories. Further, embodiments may optionally depict an amount of memory capacity that is available for recording additional programs.

Upon selection of a category of recorded programs, a category-based recorded program listing GUI is presented which lists recorded programs in the selected recorded program category. In an alternative embodiment, a predefined category of recorded programs may be used when the category-based recorded program listing GUI is initially presented. The recorded programs may be quickly and easily selected by the viewer for deletion so as to free up memory capacity for the recording of currently presented programs and/or for the recording of programs scheduled for future presentation.

The viewer remotely operates the media device 102, in this simplified example, by inputting commands using function buttons 110 on the remote control device 108. Information corresponding to intended commands are communicated from the remote 104 to the media device using a suitable communication signal. Such a signal may be communicated wirelessly, or may be communicated over a wire. Alternatively, or additionally, the viewer may input commands using controllers, function buttons, or the like (not shown) residing on the media device 102.

At some point, the viewer may wish to review and/or to delete the recorded programs in the DVR 104. In response to receiving a suitable command from the viewer, via the remote control device 108 or from another source, the media device 102 generates the recorded program category-based GUI 106 that is to be presented on a display 112. For example, the recorded program category-based GUI 106 may be displayed on a television that is communicatively coupled to the media device 102. It is to be appreciated that the display 112 may be locally and/or remotely connected to the media device 102.

The non-limiting exemplary media device 102 further comprises a program content stream interface 114, a processor system 116, a memory 118, a program buffer 120, an optional presentation device interface 122, and a remote interface 124. The memory 118 comprises portions for storing the DVR program category logic 126 and an optional current recorded program category information database 128. In some embodiments, the DVR program category logic 126 may be integrated with other logic. Other media devices may include some, or may omit some, of the above-described media processing components. Further, additional components not described herein may be included in alternative embodiments. For example, an embodiment of a media device may include a built in display.

The functionality of the media device 102, here a STB, is now broadly described. A program provider provides the programs received in one or more program content streams 130. For example, if the program provider provides programming via a satellite-based communication system, the media device 102 is configured to receive one or more broadcasted satellite signals detected by an antenna (not shown). Alternatively, or additionally, the program content stream 130 can be received from one or more different sources, such as, but not limited to, a cable system, a radio frequency (RF) communication system, or the Internet.

The one or more program content streams 130 are received by the program content stream interface 114. One or more tuners 114a in the program content stream interface 114, in an exemplary STB or other media device, selectively tune to one of the program content streams 130 in accordance with instructions received from the processor system 116. A program content stream 130 may comprise a plurality of programs multiplexed together. The processor system 116, based upon a request for a program of interest specified by the viewer, parses out program content associated with the program of interest. The program of interest may then be assembled into a stream of video and/or audio information. The information may be stored by the program buffer 120 such that the program content can be streamed out to the media presentation device, such as the television 132, via the presentation device interface 122. Alternatively, or additionally, the parsed out program content may be saved into the DVR 104 for later presentation. In alternative embodiments, the program content streams 130 may stored for later decompression, processing and/or decryption.

In some situations, the viewer may wish to record a program of interest that is currently being presented on a particular channel, received as streaming media, or the like. However, the viewer may realize that there is not sufficient memory capacity available in the DVR 104 to record the program of interest. Using at least one embodiment of the media device 102, the viewer selects a category of recorded programs so as to access the recorded program category-based GUI 106 in a relatively short period of time. Thus, the viewer can select previously recorded programs of interest that are included in the selected (or default) category of previously recorded programs for deletion. Thus, the viewer can delete one or more previously recorded programs so that additional memory capacity is available to record the currently presented program of interest, and/or a future scheduled program of interest, with little or no interruption of their current viewing.

Figures 2, 3:
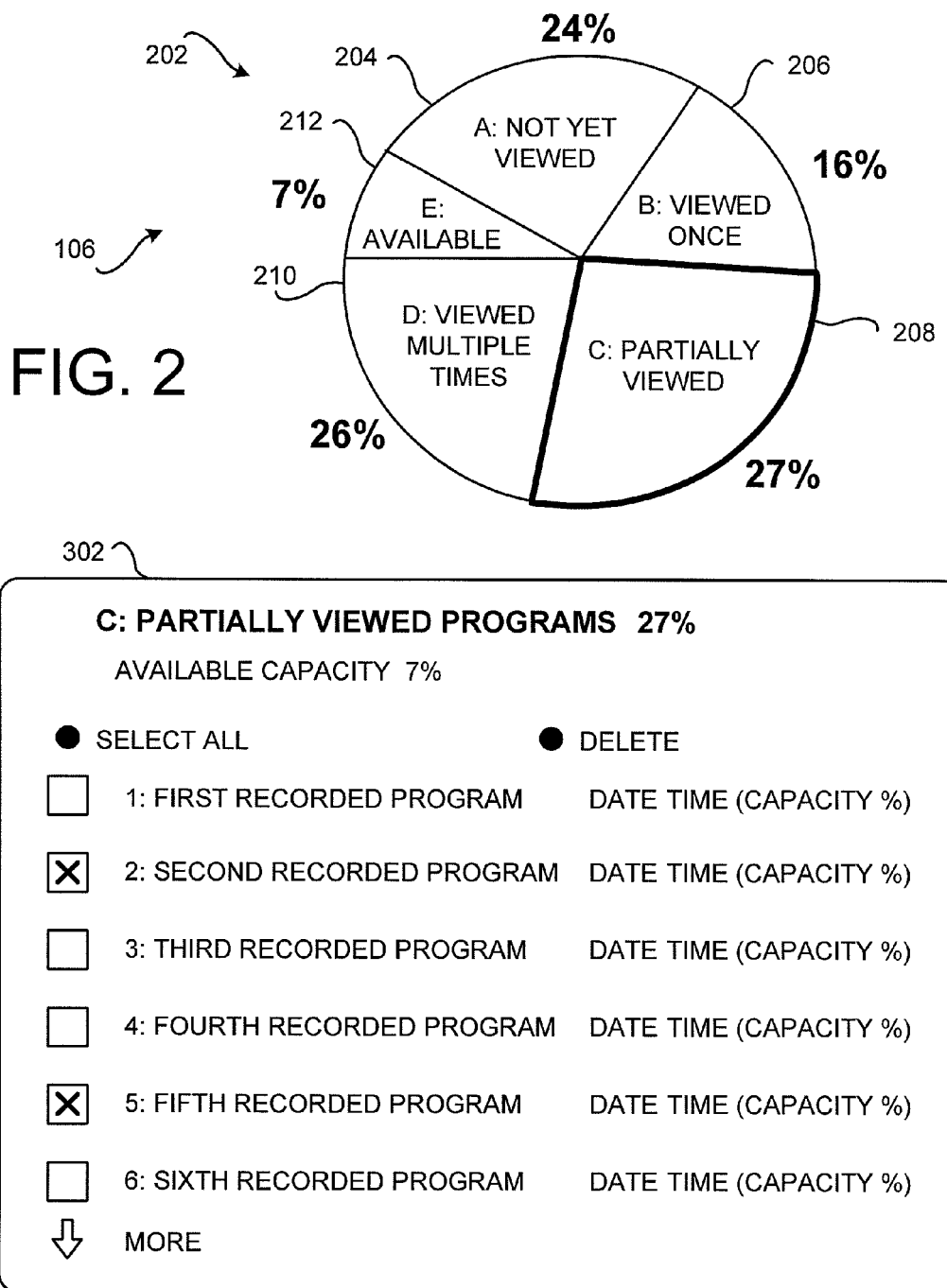
FIG. 2 is an exemplary category-based graphical user interface (GUI) illustrating the above-described four exemplary categories of previously recorded programs using a pie chart.
FIG. 3 is an exemplary category-based recorded program listing GUI illustrating a listing of previously recorded programs in a selected category.

FIG. 2 is an exemplary recorded program category-based GUI 106 illustrating four exemplary categories of previously recorded programs using an exemplary pie chart 202. The relative size of each "slice of pie" associated with a particular previously recorded program category corresponds to the relative amount of memory capacity of the DVR 104 utilized by that particular recorded program category. Alternatively, or additionally, the duration of the recording may be used to determine the size of each of the pie slices.

An exemplary embodiment categorizes previously recorded programs based upon prior viewing (or an absence of prior viewing) of the previously recorded programs. Here, the recorded program category-based GUI 106 shows four predefined categories of previously recorded programs. The four categories include; a first category of previously recorded programs that have not yet been viewed (category "A"), a second category of previously recorded programs that have been partially viewed (category "B"), a third category of previously recorded programs that have been viewed (category "C"), and a fourth category of previously recorded programs that have been viewed multiple times (category "D"). These categories A, B, C and D are graphically illustrated as "pie slices" on a pie chart. Further, the exemplary recorded program category-based GUI 106 optionally includes a category indicating the amount of available memory capacity of the DVR 104 that has not been recorded (category "E"), and is therefore immediately available for recording of a program of interest.

The DVR 104, or another processor, is configured to monitor the viewing status of all previously recorded programs. A suitable data bit, flag, or the like, is set for each previously recorded program to correspond to the viewing status of each previously recorded program. Some embodiments may cooperatively act with a digital rights management (DRM) system that is configured to monitor viewing activity of DRM programming. Thus, the DVR 104, other processor, or DRM system, tracks each of the previously recorded programs so that they can be associated with one of the predefined categories.

In this example, the pie slice 204 (FIG. 2) corresponds to the category of previously recorded programs that have not yet been viewed. The total amount of memory capacity of the DVR 104 utilized for storing these programs, which is approximately 24 percent (%) in this example, is determined by the DVR management system 100. Based upon the amount of memory capacity utilized for storing these previously recorded programs that have not yet been viewed, the relative size of the pie slice 204 of the pie chart 202 is determined. Memory capacity utilized for storing these previously recorded programs is determined based upon a selected variable. Exemplary variables include, but are not limited to, total DVR memory capacity, allocated DVR capacity for program storage, or specified allocated DVR capacity based upon one or more criteria.

The pie slice 206 corresponds to the category of previously recorded programs that have been viewed one time. The total amount of memory capacity of the DVR 104 utilized for storing these programs, which is approximately 16% in this example, is determined by the DVR management system 100. Based upon the amount of memory capacity utilized for storing these previously recorded programs that have been viewed once, the relative size of the pie slice 206 is determined.

The pie slice 208 corresponds to the category of previously recorded programs that have been partially viewed. Here, all partially viewed previously recorded programs are associated with this particular category. The total amount of memory capacity of the DVR 104 utilized for storing these programs, which is approximately 27% in this example, is determined by the DVR management system 100. Based upon the amount of memory capacity utilized for storing these previously recorded programs that have been partially viewed, the relative size of the pie slice 208 is determined.

The pie slice 210 corresponds to the category of previously recorded programs that have been viewed multiple times. Here, all previously recorded programs that have been viewed multiple times are associated with this particular category. The total amount of memory capacity of the DVR 104 utilized for storing these programs, which is approximately 26% in this example, is determined by the DVR management system 100. Based upon the amount of memory capacity utilized for storing these previously recorded programs that have been viewed multiple times, the relative size of the pie slice 210 is determined.

The pie slice 212 corresponds to the unused DVR memory capacity, which is approximately 7% in this example, is determined by the DVR management system 100. Based upon the amount of available DVR memory capacity, the relative size of the pie slice 212 is determined.

Each pie slice of the pie chart 202 includes an identifier describing the nature of the category. Here, for example, the pie slice 204 associated with the category of previously recorded programs that have not yet been viewed is indicated with the identifier "A: Not Yet Viewed" on the pie chart 202. Thus, the viewer appreciates that the pie slice 204 corresponds to those previously recorded programs that have not yet been viewed. Any suitable identifier may be used to indicate the nature of a predefined recorded program category. Such identifiers may include descriptive text and/or graphical icons. Colors and/or shading may also be used to highlight the pie slices of the pie chart 202.

Optionally, the memory capacity utilized by each type of category of previously recorded programs may be included on the category-based GUI 106. To illustrate, the memory capacity utilized by each type of category of previously recorded programs is shown at the edge of each of the pie slices 204, 206, 208, 210 and 212. The memory capacity utilized by each type of category of previously recorded programs may be shown elsewhere on the category-based GUI 106 in alternative embodiments.

In the simplified example of FIG. 2, the viewer has navigated through the category-based GUI 106 and has highlighted the pie slice 208 corresponding to partially viewed recorded programs (indicated by the identifier "C: Partially Viewed") using one or more of the navigation buttons 110 (FIG. 1) on their remote control device 108. Highlighting is conceptually illustrated by the bold-line boundary about the pie slice 208. It is appreciated that the viewer intends to obtain information about previously recorded programs in a particular program category for possible deletion, and/or intends to delete one or more of the previously recorded programs that have been associated with partially viewed programs.

A recorded program may be partially viewed for a variety of reasons. In some instances, the viewer may have started viewing one of the previously recorded programs, and ended the viewing of that particular previously recorded program because they were no longer interested in continuing with that program. (Thus, at the time of viewing, the program was re-categorized from the "recorded programs not yet viewed" category to the "partially viewed recorded programs" category.) Thus, the viewer may appreciate that it may be desirable to delete this type of previously recorded program. On the other hand, the viewer may have been interrupted during the initial viewing of the program. Thus, the viewer may appreciate that it may be desirable to retain this type of the previously recorded program.

Categories of previously recorded programs may be defined using any suitable criteria. The exemplary embodiment described herein bases categories on past viewing. For example, a category based upon programs that have been viewed multiple times is included in the exemplary embodiment since small children are likely to view a favorite recorded program many, many times. Thus, the parent who is deleting programs in the DVR 104 is less likely to inadvertently delete a child's favorite recorded program.

Program categories may be defined based on criteria such as the type of program. For example, such categories may include sporting events, news programs, movies, series, or the like. Further, categories may be defined into sub-categories. For example, movies may be categorized by type (for example, romance, action, comedy or drama) or series may be categorized by title. Such recorded programs may include meta data or other information that is used to categorize the program when recorded. Alternatively, or additionally, categories or sub-categories may be defined based upon the identity of different viewers, and/or may be defined based upon recording dates/times.

In some embodiments, program categories are predefined by the vendor, content provider, manufacturer of the like of the media device 102. Additionally, or alternatively, the user may define program categories. For example, the viewer may define a program category when the movie is selected for recording or at another suitable time.

FIG. 3 is an exemplary category-based recorded program listing GUI 302 illustrating a listing of previously recorded programs in a selected category. Once the viewer has used their remote control device 108 to navigate about the recorded program category-based GUI 106 and to highlight a category of interest, selection of that category of interest causes a transition to the presentation of the category-based recorded program listing GUI 302.

In the simplified example of FIG. 2, the viewer has highlighted the pie slice 208 corresponding to partially viewed recorded programs. Accordingly, selection of the pie slice 208 causes the DVR management system 100 to generate and display the exemplary category-based recorded program listing GUI 302 which shows a listing of previously recorded programs that have been partially viewed.

At the top of the category-based recorded program listing GUI 302, the selected category is identified. Optionally, the amount of capacity utilization for the selected category may be shown. In some embodiments, the amount of available capacity in the DVR 104 may be shown so that the viewer appreciates how much the memory capacity needs to be increased so as to provide sufficient memory capacity for the recording of currently presented programs and/or for the recording of programs scheduled for future presentation.

The category-based recorded program listing GUI 302 lists all recorded programs that are members of the selected category, here partially viewed recorded programs. Preferably, each recorded program is identified by its program title. Also, the date (and time) that the program was recorded may be optionally shown so that the viewer appreciates how long the recorded program has been stored in the DVR 104. In alternative embodiments, the amount of time, or a percentage, of the partial viewing of the recorded program may be shown. Further, the date/time of the partial viewing may be shown for partially viewed recorded programs, and/or the date/time of the last viewing may be shown for a multiple viewed recorded program.

In some embodiments, the amount of memory used by each recorded program may be optionally shown. Thus, the viewer may appreciate by how much the memory capacity will be increased when a particular previously recorded program is selected for deletion.

The exemplary category-based recorded program listing GUI 302 provides a selectable box which the viewer can navigate to select a particular previously recorded program for deletion (or viewing, or obtaining information pertaining to, the selected recorded program). To illustrate, the exemplary category-based recorded program listing GUI 302 indicates that the viewer has used their remote control device 108 to navigate to and select the second recorded program and the fifth recorded program for deletion.

In this exemplary embodiment, the category-based recorded program listing GUI 302 provides an optional deletion confirmation button ("•DELETE"). Here, deletion of selected previously recorded program does not occur until the viewer has used their remote control device 108 to navigate to and select the delete confirmation button. In alternative embodiments, the deletion may occur immediately upon selection of a previously recorded program. In some embodiments, deletion may occur after reconfirming that deletion is desired via an on-screen prompt (not shown) or the like.

On occasion, the category-based recorded program listing GUI 302 may not be large enough to list all of the previously recorded programs associated with the selected category. Accordingly, a scroll down button ("↓MORE") is provided so that the viewer may interactively page down to see other previously recorded programs associated with the selected category. Alternatively, or additionally, a scroll down button may scroll down by one previously recorded program.

In this exemplary embodiment, the category-based recorded program listing GUI 302 provides an optional select all button ("•SELECT ALL"). Here, selection of this button causes all of the previously recorded programs associated with the selected category to be deleted. Further, in this embodiment, deletion of selected previously recorded programs does not occur until the viewer has used their remote control device 108 to navigate to and select the delete confirmation button. In alternative embodiments, the select all button may be limited to selecting only those previously recorded programs that are listed on the category-based recorded program listing GUI 302.

After the selected previously recorded programs have been deleted by the DVR management system 100, the media device 102 may return to any suitable operating point. For example, the media device 102 may return to the last operating point in effect at the time that the viewer invoked the DVR management system 100. Some embodiments may return to a predefined operating point, such as a suitable program record mode of operation (such as by presentation of a program record GUI).

Figure 4:
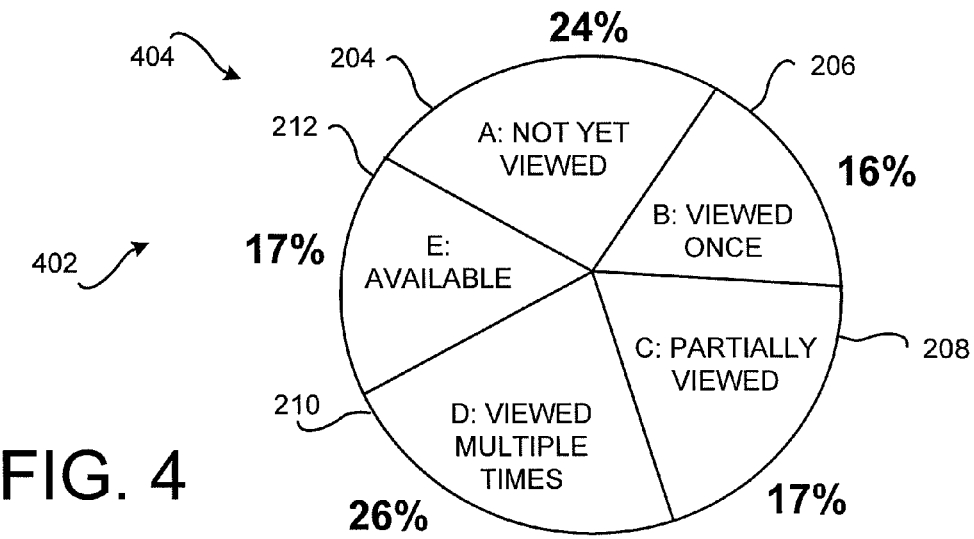
FIG. 4 is an exemplary updated category-based recorded program listing GUI.

In some embodiments, after deletion of one or more previously recorded programs, the viewer is presented an updated pie chart 402 on an updated category-based GUI 404, as illustrated in FIG. 4. The size of the pie slices are updated so that the viewer appreciates the effect of the deletion of the selected ones of the previously recorded programs. In some embodiments, updated memory capacity utilization values are shown.

In the exemplary updated pie chart 402, assume that one or more previously recorded programs associated with the partially viewed program category have been deleted to free up ten percent (10%) of the memory capacity of the DVR 104. With respect to the exemplary pie chart 202 (FIG. 2), the pie slice 208 associated with partially viewed previously recorded programs, the size of the pie slice would become smaller to indicate that the memory capacity for that category has decreased from 27% down to 17%. The size of the pie slice 212 has increased to reflect the increase in available memory capacity from 7% to 17%.

Figure 5:
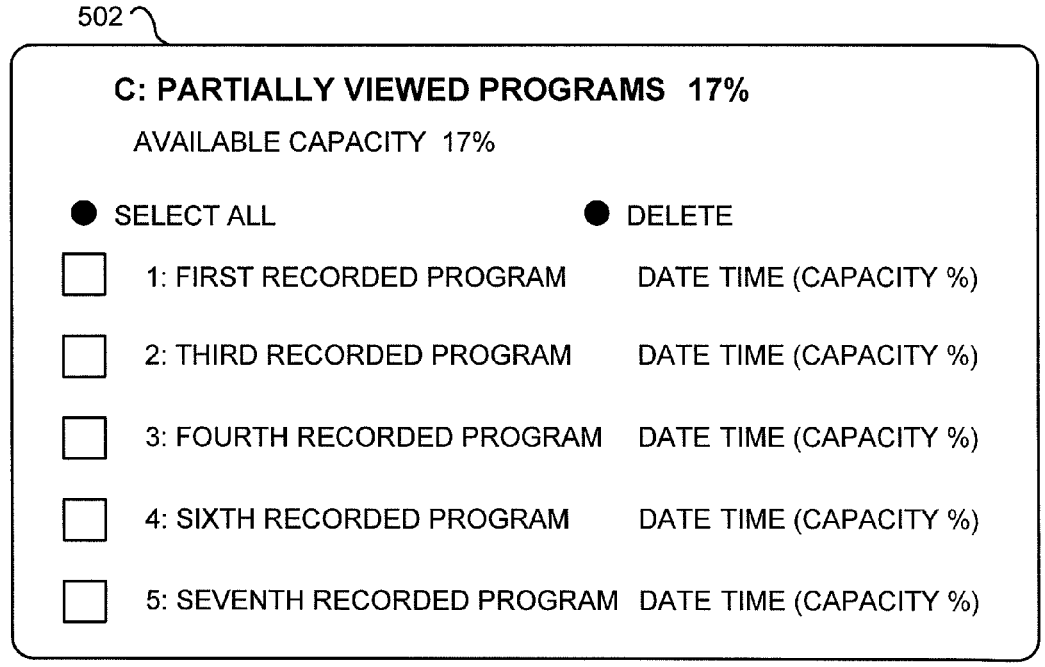
FIG. 5 is an updated exemplary category-based recorded program listing GUI.

Alternatively, or additionally, an updated category-based recorded program listing GUI 502 may be presented, as illustrated in FIG. 5. The updated category-based recorded program listing GUI 502 lists remaining ones of the previously recorded programs that are associated with the selected category. In such embodiments, a function button on the remote and/or on the GUI will be available to exit the DVR management system 100.

In the exemplary updated category-based recorded program listing GUI 502, assume that the selected second and fifth previously recorded programs (see FIG. 3) associated with the partially viewed program category have been deleted to free up ten percent (10%) of the memory capacity of the DVR 104. The updated category-based recorded program listing GUI 502 would then indicate that the memory capacity for that category has decreased from 27% down to 17%, and may optionally indicate that the available memory capacity of the DVR 104 has increased from 7% to 17%.

It is appreciated that the exemplary function buttons illustrated on the category-based recorded program listing GUI 302 are not limiting. Any suitable icon and/or text may be used for a function button. Further, other functions (and their associated function buttons) may be included on alternative embodiments of the category-based recorded program listing GUI 302. Also, functions of interest (and their associated function buttons) may be included on alternative embodiments of the category-based GUI 106.

In some embodiments, the processor system 116 retrieves and executes the DVR program category logic 126 when the viewer invokes operation of the DVR management system 100. Based upon commands received from the viewer, the DVR program category logic 126 executes to generate the category-based GUIs 106 and/or 402, and/or executes to generate the category-based recorded program listing GUI 302 and/or 502. In some applications, the DVR program category logic 126 may be used to upgrade an existing media device 102 with the DVR management system 100. Alternatively, the functionality of the DVR program category logic 126 may be integrated into logic that controls operation of the DVR 104 and/or other functions of the media device 102.

In some embodiments, selected information pertaining to the previously recorded programs is stored in the optional current recorded program category information database 128. For example, determined capacity utilization values for the various categories may be stored into the current recorded program category information database 128 on an ongoing basis. Thus, when the viewer invokes operation of the DVR management system 100, the saved information can be quickly retrieved without the need to take the time to perform the capacity utilization calculations. Likewise, the categorization of the previously recorded programs may be stored in the current recorded program category information database 128. Also, other information of interest, such as the program titles and/or recording dates/times, may be saved in the current recorded program category information database 128. Alternatively, the information may be determined by analyzing the previously recorded programs stored in the DVR 104 when the viewer invokes operation of the DVR management system 100.

A listing of previously recorded programs is based upon a selected category and/or sub-category in the category-based recorded program listing GUI 302. Listings of previously recorded programs in the selected program category may be ordered in any desired manner. For example, previously recorded programs may be listed in order of their recording date/time. Alternatively, or additionally, previously recorded programs may be listed in order of identified viewers, program titles, and/or other program attributes of interest. As another example, previously recorded programs may be ordered by the time/date of viewing for a once viewed recorded program, by the time/date of partial viewing for a partially viewed recorded program, and/or by the time/date of the most recent viewing for a multiple viewed recorded program.

Some embodiments may include other selectable functions on the category-based recorded program listing GUI 302. For example, previously recorded programs may be selected for viewing and/or may be selected to obtain additional information of interest pertaining to the selected recorded program.

The exemplary category-based GUI 106 was described and illustrated as presenting the categories of previously recorded programs using a pie chart format. In alternative embodiments, different formats of indicating the different categories of previously recorded programs may be used. Non-limiting examples of different formats include bar charts, line charts, bubble charts, three dimensional charts, Euler diagrams, Venn diagrams, graphs, tables, or combinations thereof.

Embodiments of the DVR management system 100 may be implemented in devices that are remote from the DVR 104. For example, an exemplary embodiment installed in personal computer, lap top computer, or personal media device may remotely access the DVR 104 to manage the previously recorded programs. Thus, a user on an out of town trip may remotely access his media device 102 and manage the previously recorded programs.

In some devices, the DVR 104 is a remote DVR device that is external to, but in communication with, the media device 102. Accordingly, the DVR management system 100 may manage the previously recorded programs on a remote DVR 104.

Some embodiments may alternatively, or additionally, use duration of recorded programs to determine memory utilization of previously recorded programs. For example, the category-based recorded program listing GUI 302 may show the duration of the recorded programs.

In some embodiments, a previously recorded program may be categorized in more than one category.

It should be emphasized that the above-described embodiments of the DVR management system 100 are merely possible examples of implementations of the invention. Many variations and modifications may be made to the above-described embodiments. All such modifications and variations are intended to be included herein within the scope of this disclosure and protected by those claims arising, directly or indirectly, from this application.

The invention claimed is:
1. A method for managing previously recorded programs, the method comprising:
identifying a plurality of previously recorded programs;
determining a viewing history of each one of the plurality of previously recorded programs;
categorizing each one of the plurality of previously recorded programs into at least one of a plurality of recorded program categories based upon the viewing history;
determining an amount of memory capacity utilized by each of the plurality of previously recorded programs;
for each one of the plurality of recorded program categories, determining an amount of memory capacity utilized by each one of the recorded program categories, wherein the amount of memory capacity utilized by each recorded program category corresponds to the amount of memory capacity utilized by each of the previously recorded programs categorized as members of that respective recorded program category; and
generating a recorded program category-based graphical user interface (GUI),
wherein the recorded program category-based GUI graphically depicts a chart showing each of the plurality of recorded program categories as an icon, and wherein a size of each of the respective icons of the chart of the recorded program category-based GUI graphically depicts the amount of memory capacity utilized by each of the plurality of recorded program categories.

2. The method of claim 1, further comprising:
storing information corresponding to the viewing history category of each one of the plurality of previously recorded programs.

3. The method of claim 2, further comprising:
retrieving the stored information corresponding to the viewing history category of each one of the plurality of previously recorded programs in response to a request for presentation of the recorded program category-based GUI.

4. The method of claim 1, wherein in response to a viewing of one of the selected previously recorded programs, further comprising:
determining an updated viewing history of the selected previously recorded program; and
re-categorizing the selected previously recorded programs based upon the viewing history.

5. The method of claim 1, wherein the recorded program category-based GUI graphically depicts the amount of memory capacity utilized by each of the plurality of recorded program categories using a pie chart format.

6. The method of claim 1, wherein the recorded program category-based GUI graphically depicts an amount of memory capacity available for recording of at least one program.

7. The method of claim 1, further comprising:
specifying a category type of the at least one of a plurality of recorded program categories.

8. The method of claim 1, further comprising:
generating a category-based recorded program listing GUI in response to receiving a selection of one of the plurality of recorded program categories, wherein the category-based recorded program listing GUI lists the previously recorded programs that have been categorized into the selected recorded program category; and
presenting the category-based recorded program listing GUI on a display.

9. The method of claim 8, wherein presenting the category-based recorded program listing GUI on the display comprises:
presenting the amount of memory capacity utilized by each of the plurality of recorded programs that have been categorized into the selected recorded program category.

10. The method of claim 9, further comprising:
deleting at least one of the plurality of previously recorded programs listed on the category-based recorded program listing GUI in response to receiving a selection identifying the deleted at least one previously recorded program.

11. The method of claim 10, in response to deleting the at least one of the plurality of previously recorded programs listed on the category-based recorded program listing GUI, further comprising:
identifying a plurality of remaining previously recorded programs that have been categorized into the selected recorded program category; and
generating an updated recorded program category-based GUI;
wherein the updated recorded program category-based GUI graphically depicts the plurality of recorded program categories, and
wherein the updated recorded program category-based GUI graphically depicts an updated amount of memory capacity utilized by each of the plurality of recorded program categories based upon an amount of memory capacity utilized by the remaining previously recorded programs.

12. The method of claim 11, wherein the updated recorded program category-based GUI graphically depicts an updated amount of memory capacity available for recording of at least one program.

13. A program recording management system, comprising:
a program content stream interface configured to receive a plurality of programs;
a digital video recorder (DVR) configured to store a plurality of selected ones of the received plurality of programs; and
a processor system that manages the stored plurality of programs on the DVR, wherein the processor system is configured to:
determine a viewing history of each one of the plurality of programs stored in the DVR;
categorize each one of the stored plurality of programs as a member of one of a plurality of recorded program categories based upon the viewing history;
determine an amount of memory capacity utilized by each of the plurality of previously recorded programs;
for each one of the plurality of recorded program categories, determine an amount of memory capacity utilized by each one of the recorded program categories, wherein the amount of memory capacity utilized by each recorded program category corresponds to the amount of memory capacity utilized by each of the previously recorded programs categorized as members of that respective recorded program category; and
generate a recorded program category-based graphical user interface (GUI),
wherein the recorded program category-based GUI graphically depicts the plurality of recorded program categories, and
wherein the recorded program category-based GUI graphically depicts an amount of memory capacity utilized by each of the plurality of recorded program categories based upon an amount of memory capacity utilized by the stored plurality of programs.

14. The program recording management system of claim 13, further comprising:
a presentation device interface communicatively coupled to the processor system, configured to communicatively couple to a media presentation device, and configured to communicate the recorded program category-based GUI to a display of the media presentation device; and
a remote interface communicatively coupled to the processor system and configured to receive a request signal from a remote control device,
wherein in response to receiving the request signal from the remote control device, the recorded program category-based GUI is communicated from the presentation device interface to the media presentation device.

15. The program recording management system of claim 14, wherein the processor system is further configured to:
generate a category-based recorded program listing GUI in response to receiving a selection of one of the plurality of recorded program categories in a second signal received by the remote control device, wherein the category-based recorded program listing GUI lists the previously recorded programs that have been categorized into the selected recorded program category; and output the category-based recorded program listing GUI to a display.

16. The program recording management system of claim 13, wherein the program recording management system is implemented in a set top box.

17. A method for managing previously recorded programs, the method comprising:
    determining a viewing history of each one of the previously recorded programs;
    categorizing each one of the plurality of previously recorded programs into at least one of a plurality of recorded program categories based upon the viewing history;
    presenting a recorded program category-based GUI on a display,
        wherein the recorded program category-based GUI graphically depicts a chart showing each of the plurality of recorded program categories as an icon, and
        wherein a size of each of the respective icons of the chart of the recorded program category-based GUI graphically depicts a sum of an amount of memory capacity corresponding to an amount of memory capacity utilized by each of the plurality of recorded program categories based upon an amount of memory capacity utilized by previously recorded programs that have been categorized as members of the respective ones of the plurality of recorded program categories, and
        wherein the plurality of recorded program categories are defined based upon the viewing history;
    receiving a selection of one of the plurality of recorded program categories; and
    presenting the category-based recorded program listing GUI,
        wherein the category-based recorded program listing GUI lists the previously recorded programs that have been categorized into the selected recorded program category.

18. The method of claim 17, further comprising:
    deleting at least one of the plurality of previously recorded programs listed on the category-based recorded program listing GUI in response to receiving a selection identifying the at least one previously recorded program.

19. The method of claim 18, in response to deleting the at least one of the plurality of previously recorded programs listed on the category-based recorded program listing GUI, further comprising:
    identifying a plurality of remaining previously recorded programs that have been categorized into the selected recorded program category;
    generating an updated recorded program category-based GUI;
    wherein the updated recorded program category-based GUI graphically depicts the plurality of recorded program categories; and
    wherein the updated recorded program category-based GUI graphically depicts an updated amount of memory capacity utilized by each of the plurality of recorded program categories based upon an amount of memory capacity utilized by the remaining previously recorded programs.

* * * * *